United States Patent
Gopalakrishnan et al.

(10) Patent No.: US 12,134,343 B2
(45) Date of Patent: Nov. 5, 2024

(54) DEVICE FOR COMPENSATING CUT-OFF LINE DRIFT OF A LAMP, LAMP COMPRISING THE DEVICE AND VEHICLE COMPRISING THE LAMP

(71) Applicant: Hella GmbH & Co. KGaA, Lippstadt (DE)

(72) Inventors: Kailash Gopalakrishnan, Kerala (IN); Prethyush Tazath Pullaikudy, Kerala (IN)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 18/508,952

(22) Filed: Nov. 14, 2023

(65) Prior Publication Data

US 2024/0083341 A1 Mar. 14, 2024

Related U.S. Application Data

(63) Continuation of application No. PCT/EP2021/064014, filed on May 26, 2021.

(51) Int. Cl.
*B60Q 1/068* (2006.01)
*B60Q 1/076* (2006.01)
(Continued)

(52) U.S. Cl.
CPC ............. *B60Q 1/068* (2013.01); *B60Q 1/076* (2013.01); *F21V 21/13* (2013.01); *F21V 21/22* (2013.01);
(Continued)

(58) Field of Classification Search
CPC .......... F21V 21/13; F21V 21/22; F21V 21/26; F21V 21/28; F21V 21/29; F21V 21/30; B60Q 1/068; B60Q 1/076
See application file for complete search history.

(56) References Cited

U.S. PATENT DOCUMENTS

| | | |
|---|---|---|
| 5,099,400 A | 3/1992 | Lee |
| 6,652,130 B2 | 11/2003 | Mochizuki et al. |

(Continued)

FOREIGN PATENT DOCUMENTS

| | | |
|---|---|---|
| CN | 108534014 A * | 9/2018 |
| CN | 213065974 U | 4/2021 |

(Continued)

OTHER PUBLICATIONS

Machine translation of CN 108534014 A retrieved from the FIT database of PE2E search. (Year: 2024).*

(Continued)

*Primary Examiner* — Colin J Cattanach
(74) *Attorney, Agent, or Firm* — Husch Blackwell LLP

(57) ABSTRACT

A device is provided for compensating cut-off line drift of a lamp in a vehicle. An adjustment unit adjusts the lighting direction of the lamp. A carrier frame carries a lighting unit of the lamp. A triangularly shaped connecting means mechanically connects the adjustment unit with the carrier frame. The connecting means includes a first joint at a first corner of the connecting means, a second joint at a second corner of the connecting means, a third joint at a third corner of the connecting means, a first conjunction unit connected between the first joint and the second joint, a second conjunction unit connected between the first joint and the third joint, and a third conjunction unit connected between the second joint and the third joint. The joints move the conjunction units relative to each other for compensating the cut-off line drift.

13 Claims, 4 Drawing Sheets

(51) Int. Cl.
*F21V 21/13* (2006.01)
*F21V 21/22* (2006.01)
*F21V 21/26* (2006.01)
*F21V 21/28* (2006.01)
*F21V 21/29* (2006.01)
*F21V 21/30* (2006.01)

(52) U.S. Cl.
CPC ............... *F21V 21/26* (2013.01); *F21V 21/28* (2013.01); *F21V 21/29* (2013.01); *F21V 21/30* (2013.01)

(56) References Cited

U.S. PATENT DOCUMENTS

| | | | |
|---|---|---|---|
| 2007/0082577 A1 | 4/2007 | Tajima | |
| 2022/0107050 A1* | 4/2022 | Fladhammer | .......... F16M 11/18 |

FOREIGN PATENT DOCUMENTS

| | | | | |
|---|---|---|---|---|
| DE | 10131098 A1 | * | 1/2003 | ........... B60Q 1/0683 |
| DE | 10205215 A1 | * | 10/2003 | ............. B60Q 1/076 |
| EP | 309417 A1 | | 3/1989 | |
| EP | 3470268 A1 | | 4/2019 | |
| EP | 3795421 A1 | | 3/2021 | |
| FR | 2764851 A1 | * | 12/1998 | ........... B60Q 1/0683 |
| KR | 101127067 B1 | | 3/2012 | |
| WO | WO-2008044905 A1 | * | 4/2008 | ............. B60Q 1/068 |

OTHER PUBLICATIONS

Machine translation of DE 10131098 A1 retrieved from the FIT database of PE2E search. (Year: 2024).*

Machine translation of FR 2764851 A1 retrieved from the FIT database of PE2E search. (Year: 2024).*

Machine translation of DE 10205215 A1 retrieved from the FIT database of PE2E search. (Year: 2024).*

* cited by examiner

DEVICE FOR COMPENSATING CUT-OFF LINE DRIFT OF A LAMP, LAMP COMPRISING THE DEVICE AND VEHICLE COMPRISING THE LAMP

CROSS REFERENCE TO RELATED APPLICATIONS

This application claims priority to PCT Application No. PCT/EP2021/064014, filed May 26, 2021, the entirety of which is hereby incorporated by reference.

FIELD OF THE INVENTION

The present invention relates to a device for compensating cut-off line drift of a lamp in a vehicle, comprising an adjustment unit for adjusting the lighting direction of the lamp and a carrier frame for carrying a lighting unit of the lamp. The invention further relates to a lamp comprising such a device and a vehicle comprising such a lamp, in particular as a headlamp.

BACKGROUND OF THE INVENTION

In case of poor visibility conditions, a driver of a vehicle tends to feel stressed. The strain eases if the road ahead is well lit. That means, good lighting is key for save traveling with high driving comfort. Over the years, headlamps for vehicles have thus been developed into complex lighting systems. For example, there are dynamic bend lighting function, where the light modules rotate according to the steering angle, nearly doubling the range of visibility in a curve. As another example, adaptive front light systems have been developed, where both the steering angle and the vehicle speed as parameters are used for illuminating the road. One of the most recent systems is the so called adaptive cut-off line system, which utilizes data gathered from the vehicle's surroundings to generate the light distribution. A camera may detect oncoming traffic and cars ahead and, based thereon, different modules adjust the lighting within milliseconds. In particular, the system may detect other vehicles based on their lighting and regulates the headlamps automatically in order to locate the cut-off line, that is, a light cone of the own vehicle, preferably directly in front of oncoming traffic, or just behind a vehicle ahead. With the adaptive cut-off line, it is aimed to provide always optimal visibility to the driver without interfering traffic around the vehicle. However, these systems may tend to have cut-off line drifts and light drifts, respectively. In particular, cut-off line drifts may result from and/or depend on the type of material used in the headlamp, a placement of components in and/or at the headlamp, and in particular temperature conditions in and/or at the headlamp.

In order to deal with temperature issues and resulting light drift problems in headlamps, there are different solutions known in prior art. For example, in the European patent application EP 3 795 421 A1 a lighting system is described, in which a main optical unit is mounted to a carrier frame by means of spring-loaded ball joints. In the Chinese utility model CN 213065974 U, a headlamp is described comprising spring loaded screws between a carrier frame and a lighting unit in order to address thermal issues. However, with regard to possible cut-off line drift, the known systems are quite complex to install and challenging to control in the desired way.

BRIEF SUMMARY OF THE INVENTION

It is an object of the present invention to overcome the above-mentioned disadvantages. In particular, it is an object of the present invention to provide a system for easily and reliably compensating and/or preventing cut-off line drift.

Aforesaid object is achieved by the subject-matters of the claims. Features and details of the invention can also be drawn from the dependent claims, the description, and the figures. Features and details discussed with respect to the inventive device are also correlated with the inventive lamp, the inventive vehicle, and the other way around.

According to the present invention, a device is provided for compensating cut-off line drift of a lamp in a vehicle, comprising an adjustment unit for adjusting the lighting direction of the lamp and a carrier frame for carrying a lighting unit of the lamp. The device further comprises triangularly shaped connecting means mechanically connecting the adjustment unit with the carrier frame, comprising a first joint at a first corner of the connecting means, a second joint at a second corner of the connecting means, a third joint at a third corner of the connecting means, a first conjunction unit connected between the first joint and the second joint, a second conjunction unit connected between the first joint and the third joint, and a third conjunction unit connected between the second joint and the third joint, wherein the joints are configured for moving the conjunction units relative to each other for compensating the cut-off line drift.

With the inventive device, cut-off line drift can be drastically reduced as the connecting means is able to compensate and/or prevent problematic movements and/or expansions of components of the lamp over the entire length between the carrier frame and the adjustment unit. With the three joints, the compensation can be performed automatically and thus with particular efficiency. Further, by means of the device, deflection of a lamp housing due to thermal impact can be reliably compensated, which directly affects the desired compensation and/or prevention of the cut-off line drift. The passenger and/or driver of the vehicle will not be influenced since the adjustments and settings of the lamp remain the same. That is, there are no buttons or actuators to be actively controlled in order to achieve the desired compensation effect. The proposed device also works with a minimal amount of required connecting elements compared to existing adjustment systems. The device can be made as a standard part, where the length of the third conjunction unit alone can be manipulated based on the compensation required.

Compensating cut-off line drift can be understood as preventing cut-off line drift and/or compensating and/or preventing a light drift or light beam drift due to movement and/or expansions of components of the lamp and/or components at the lamp. That is, cut-off line drift can be prevented because the device and the connecting means in particular can compensate and/or balance a movement and/or an expansion of components of the lamp and/or at the lamp. Such components can be the regarded as the carrier frame or parts of the carrier frame, the adjustment unit, or parts of the adjustment unit, and/or functional parts supporting the carrier frame and/or the adjustment unit.

The connecting means comprises the shape of a triangle or in general the shape of a triangle. The connecting means may comprise rounded corners, which can be shaped by the joints. The adjustment unit may comprise horizontal adjustment means for horizontal adjustment of the carrier frame and/or the lighting unit carried and/or supported by the carrier frame. The adjustment unit may further comprise vertical adjustment means for vertical adjustment of the carrier frame and/or the lighting unit carried and/or supported by the carrier frame. The mechanical connection between the connecting means and the carrier frame and/or between the connecting means and the adjusting unit can be interlocking and/or force-fitted, in particular demountable without the need of destroying components of the connecting means, the carrier frame and/or the adjustment unit.

Moving the conjunction means relative to each other for compensating the cut-off line drift means that at least one conjunction means may be moved by articulating at least one of the joints in order to compensate and/or balance movement and/or expansion of components of the lamp and/or at the lamp and thus compensating and/or preventing the cut-off line drift.

According to a further embodiment of the present invention, the second joint and the third joint of a device are mounted at the carrier frame and the first joint is mounted at the adjustment unit. With such a configuration, a stable and still flexible mechanical connection between the adjustment unit and the carrier frame can be provided. The second joint and the third joint are preferably interlocked and/or form-fitted at the carrier frame. The first joint is preferably interlocked and/or form-fitted at the adjustment unit.

Further, in a device according to the present invention, the first joint comprises a ball joint allowing free rotation of the first joint in two planes at the same time while preventing translation of the first joint in any direction. That means, the ball joint may allow free rotation in two planes at the same time while preventing translation in any direction of the ball joint and/or the first joint and respective movement of the first and second conjunction units. With the ball joint, high flexibility for the desired compensation can be provided while still having a stable connection between the connecting means and the adjustment unit. The ball joint can be provided as a spherical bearing connecting the first and second conjunction units with each other as well as with the adjustment unit. The adjustment unit or part of the adjustment unit may form a casing of the ball joint. That is, the ball joint or part of the ball joint might be regarded as being part of the adjustment unit.

An inventive device may further provide that the first joint, the second joint and/or the third joint are configured for allowing a scissor movement between pairs of conjunction units. In particular, the first joint, the second joint and/or the third joint are configured for allowing a scissor movement only between pairs of conjunction units. Preferably, the first joint, which is configured as a ball joint, may allow only scissor movement between the first conjunction unit and the second conjunction unit. The second joint may be configured to allow, or allow only, scissor movement between the first conjunction unit and the third conjunction unit. The third joint may be configured to allow, or allow only, scissor movement between the second conjunction unit and the third conjunction unit.

In accordance with another embodiment of an inventive device, the first conjunction unit, the second conjunction unit and/or the third conjunction unit may each comprise extension means for linear extending the respective conjunction unit. By means of such conjunction unit, the desired compensation can be performed in an easy and effective manner. The extension means may have telescopic means for telescopically extending a first part of the conjunction unit from a second part of the conjunction unit. The first part and the second part may each be rod- and/or shaft-shaped. Having the extension means for linear extending at least one conjunction unit, the desired compensation can be performed without amending the distance between the adjustment unit and the carrier frame.

In a further embodiment of the present invention, it is possible that the first conjunction unit and the second conjunction unit of a device are each formed in one piece and the third conjunction unit comprises the extension means for linear extending the third conjunction unit when the conjunction units are moved relative to each other. This provides a simple and robust mode of the device. Having as little parts as possible also results in advantageous logistics. With such a configuration, the distance between the adjustment unit and the carrier frame is changeable while performing the desired compensation.

Moreover, it is possible that at least part of the first conjunction unit of an inventive device is an integral and/or monolithic part of the first joint and/or the second joint, at least part of the second conjunction unit is an integral and/or monolithic part of the first joint and/or the third joint and/or at least part of the third conjunction unit is an integral and/or monolithic part of the second joint and/or the third joint. For example, a part of the first conjunction and a part of the second conjunction unit may each form part of the first joint, wherein the first joint may further comprise a connection element for providing the joint connection between the first conjunction unit and the second conjunction unit. It is further possible that the first joint is completely built by parts which extend in a monolithic way from the first conjunction unit and the second conjunction unit. Same applies in an analogue manner for the second joint and the third joint. In an embodiment, in which only the third conjunction unit comprises extension means, a distance between the adjustment unit and the carrier frame may be changed by moving the conjunction units relative to each other. This might be configured on purpose in order to compensate expanding components of the lamp, for example.

Furthermore, an inventive device can be configured such that the first conjunction unit, the second conjunction unit and/or the third conjunction unit are each rod-shaped. Such configuration is easy to implement. Further, rod-shaped conjunction units are easy to manufacture and easy to handle regarding logistic aspects.

In addition to the a above it is possible that the carrier frame of an inventive device comprises a plain bearing, wherein at least part of the third conjunction unit is supported in the plain bearing. By means of this measure, the conjunction unit, the second joint as well as the third joint are flexibly supported in an easy and still reliable manner in order to be moved during the compensation of the cut-off line drift. In a preferred embodiment, at least part of the third conjunction unit of an inventive device is fixed to the carrier frame. Thus, the device can be provided particularly stable and still flexible for the desired compensation. The fixed part of the third conjunction unit can be form-fitted and/or interlocked at the plain bearing, wherein at least one, preferred two other parts of the third conjunction unit are supported moveable in the plain bearing for relative movement with respect to the interlocked and/or form-fitted part of the third conjunction unit. In this way, the third conjunction unit can be held securely at the carrier frame, while the desired flexibility for compensating the cut-off line drift can still be achieved.

According to a further aspect of the invention, a lamp for a vehicle comprising a device as described in detail above is provided. Therefore, the inventive lamp brings up the same advantages that have been discussed in detail with respect to the inventive device. In such a lamp, the carrier frame may carry at least part of an LED-lightsource or a laser-lightsource. It has been found that even relatively cold light sources like an LED-lightsource and a laser-lightsource may profit from the inventive device and the connecting means in particular. Further, the carrier frame of an inventive lamp can be turnable fixed to a fixing point. That means, the carrier frame will still be turnable and/or swivel-mounted but can not be moved in a linear direction. In this way, the lighting unit is free to be panned in the desired directions while still providing a stable enough lamp configuration. The inventive lamp is preferably provided as a head lamp.

In addition to the above, a vehicle is provided comprising at least one, preferably at least two lamps, in particular head lamps, as they were described above. Therefore, the inventive vehicle brings up the above advantages as well.

Further measures improving the inventive concept can be drawn from the following description of preferred embodiments, which are schematically shown in the drawings. The features and advantages, which can be drawn from the claims, from the description and from the drawings, might be considered essential alone or in combination with each other.

BRIEF DESCRIPTION OF THE DRAWINGS

Reference is now made more particularly to the drawings, which illustrate the best presently known mode of carrying out the invention and wherein similar reference characters indicate the same parts throughout the views.

Figure 1:
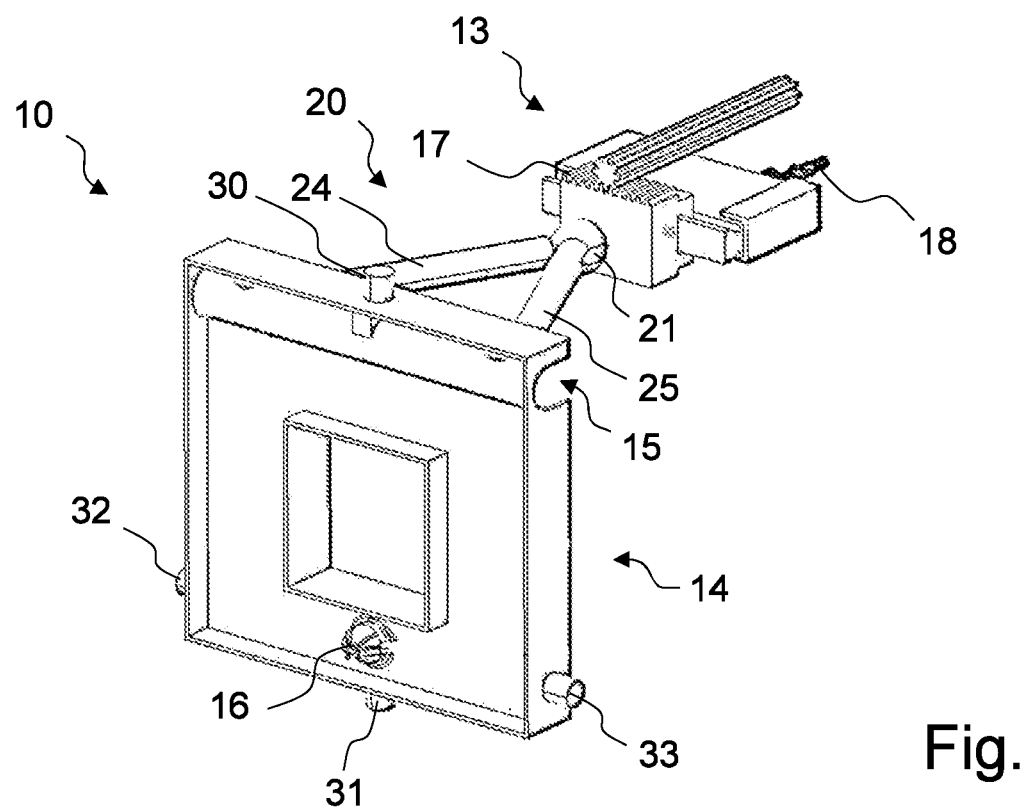
FIG. 1 shows part of a lamp in a perspective view comprising a device according to a first embodiment of the present invention.

Elements and features having the same function and operating principle are labeled with the same reference signs in the drawings.

DETAILED DESCRIPTION OF THE DRAWING

Figure 2:
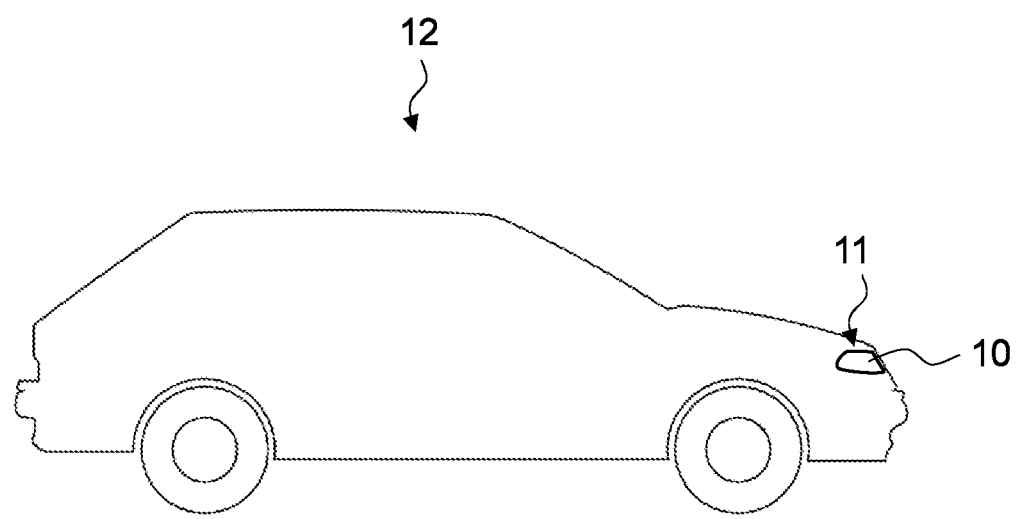
FIG. 2 shows a vehicle with a lamp according to a preferred embodiment of the present invention.

FIG. 1 shows a device 10 for compensating cut-off line drift of a lamp 11 in a vehicle 12, which is shown in FIG. 2. The device comprises an adjustment unit 13 for adjusting the lighting direction of the lamp 11 and a carrier frame 14 for carrying a lighting unit of the lamp 11. In the shown example, the adjustment unit 13 comprises horizontal adjustment means 17 for horizontal adjustment of the lighting unit and vertical adjustment means 18 for vertical adjustment of the lighting unit. The lighting unit will be adjusted by adjusting the carrier frame 14. The carrier frame 14 comprises a plain bearing 15 for moveably supporting parts of the connecting means 20.

The shown device 10 further comprises a triangularly shaped connecting means 20 mechanically connecting the adjustment unit 13 with the carrier frame 14. The carrier frame 14 comprises a fixing point 16, by means of which the carrier frame 14 is fixed and/or supported in a turnable manner. The vehicle 12 shown in FIG. 2 comprises two lamps 11 as head lamps, wherein the lamps 11 each carry an LED-lightsource at the carrier frame 14. The carrier frame 14 is guided at a top guiding part 30, a bottom guiding part 31, a left guiding part 32 and a right guiding part 33 for horizontal and vertical rotation and/or movement of the carrier frame 14. Specifically, the left guiding part 32 and the right guiding part 33 are provided for vertical planar movement of the carrier frame 14, while the top guiding part 30 and the bottom guiding part 31 are provided for horizontal planar movement of the carrier frame 14.

With respect to FIG. 3 and FIG. 4, a device 10 will be explained in more detail with regard to a second embodiment. The shown device 10 comprises a first joint 21 at a first corner of the connecting means 20, a second joint 22 at a second corner of the connecting means 20, a third joint 23 at a third corner of the connecting means 20, a first conjunction unit 24 connected between the first joint 21 and the second joint 22, a second conjunction unit 25 connected between the first joint 21 and the third joint 23, and a third conjunction unit 26 connected between the second joint 22 and the third joint 23, wherein the joints 21, 22, 23 are configured for moving the conjunction units 24, 25, 26 relative to each other for compensating the cut-off line drift.

Figure 3:
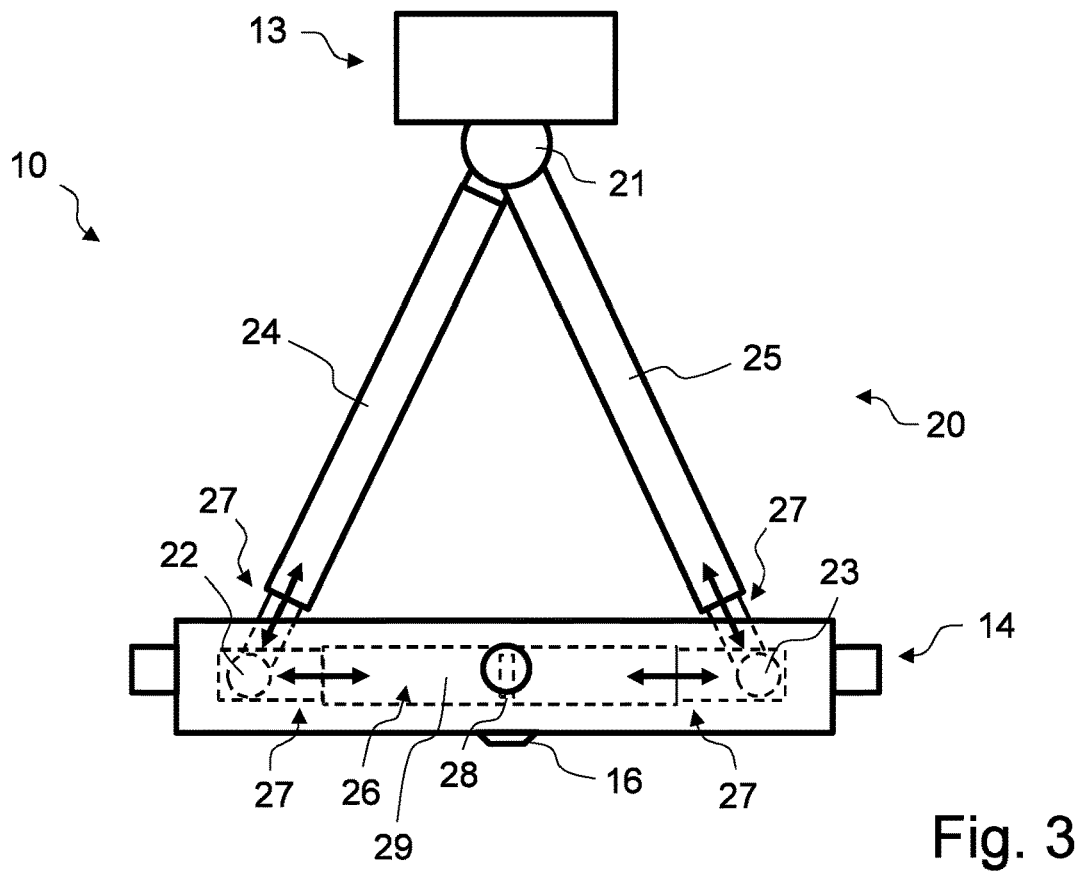
FIG. 3 shows a device in a top view according to a second embodiment of the present invention.
Figure 4:
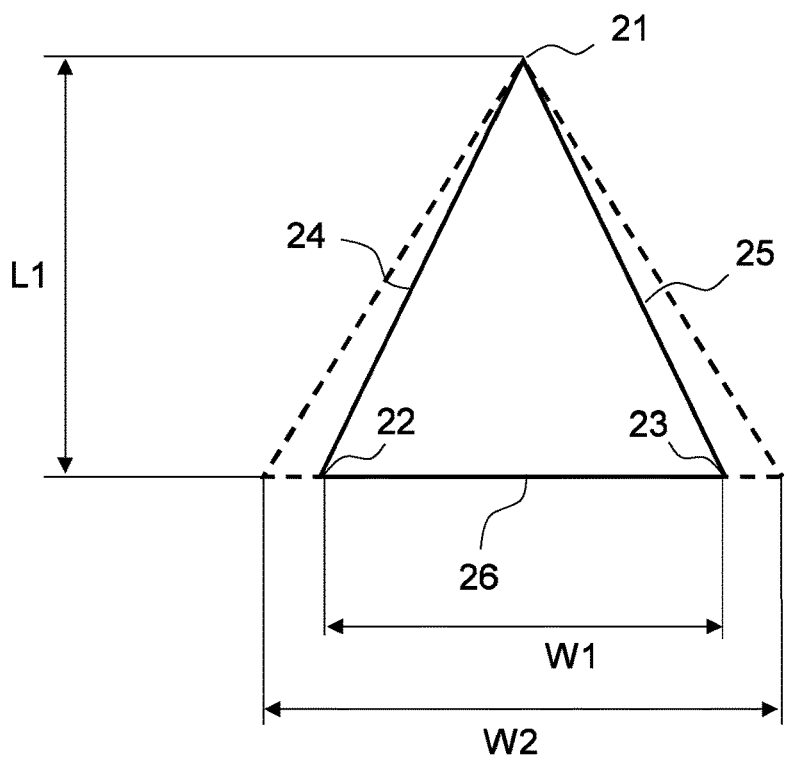
FIG. 4 shows an illustration of the device according to the second embodiment.

As shown in FIG. 3, the second joint 22 and the third joint 23 are mounted at the carrier frame 14. The first joint 21 is mounted at the adjustment unit 13 and the horizontal adjustment means 17 in particular. As can be drawn from FIG. 3, the first joint 21 comprises a ball joint or part of a ball joint integrated into the adjustment unit 13 allowing free rotation of the first joint 21 in two planes at the same time while preventing translation of the first joint 21 in any direction. In the shown example, the second joint 22 and the third joint 23 each comprise a ball joint as well. At the third conjunction unit 26, a locking pin 28 is provided holding a middle part 29 of the third conjunction unit 26 in a fixed position at the carrier frame 14 and the plain bearing 15, respectively. This ensures the desired elongation of the third conjunction unit 26 on either direction when compensating deformation.

The first joint 21, the second joint 22 and the third joint 23 are configured for allowing a scissor movement between each adjacent pair of conjunction units 24, 25, 26. The first conjunction unit 24, the second conjunction unit 25 and the third conjunction unit 26 each comprise telescopic extension means 27 for linear extending the respective conjunction unit 24, 25, 26. Therefore, the conjunction units 24, 25, 26 can be moved relative to each other without changing the length L1 of the connecting means 20. This is shown in FIG. 4. As can be further drawn from FIG. 4, the width of the connecting means can be changed from width W1 to width W2 without changing the length L1.

Figure 5:
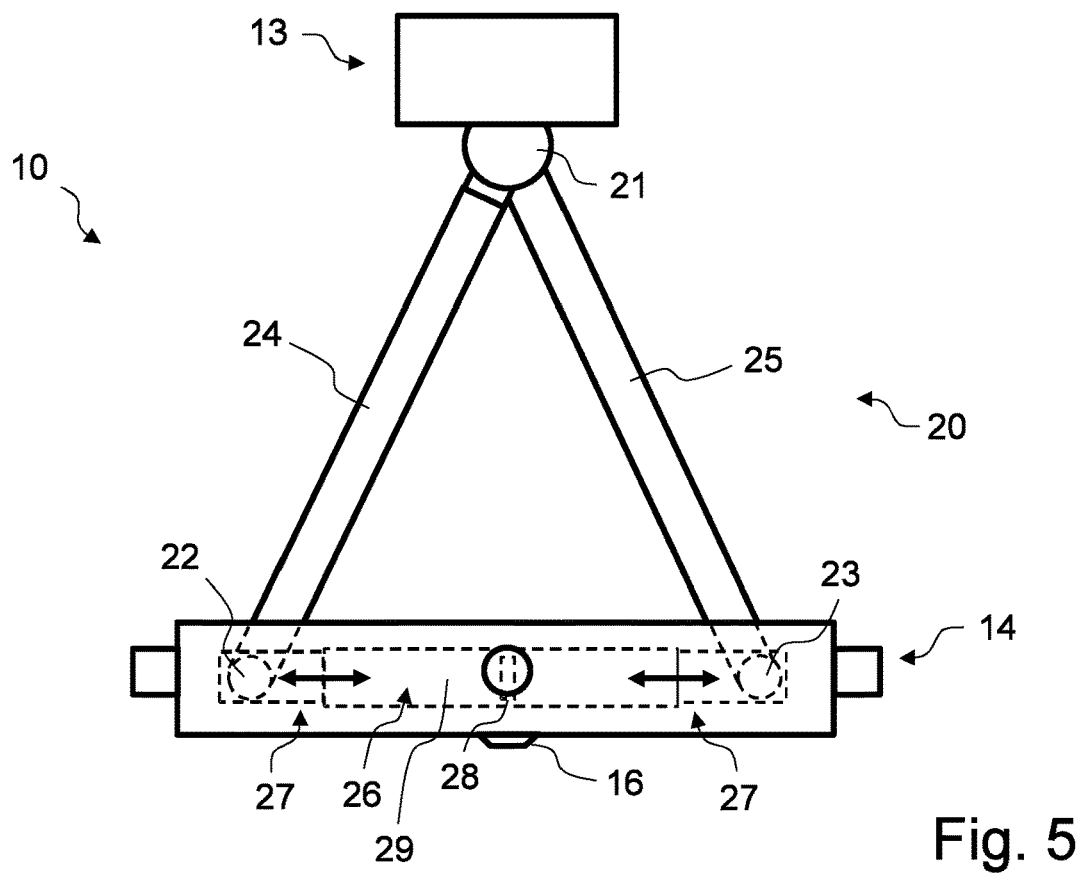
FIG. 5 shows a device in a top view according to a third embodiment of the present invention.
Figure 6:
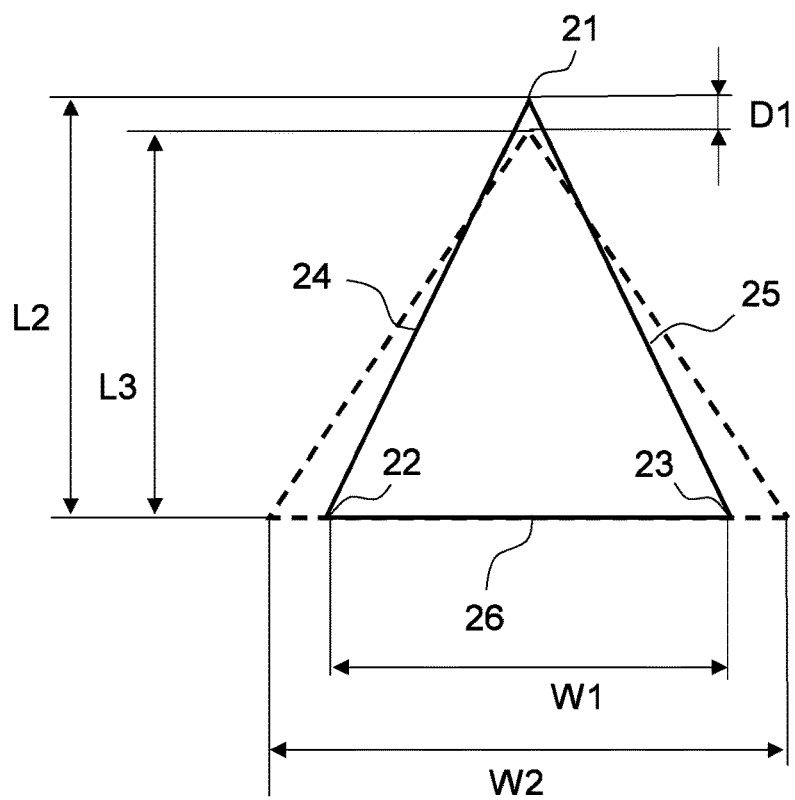
FIG. 6 shows an illustration of the device according to the third embodiment.
Figure 7:
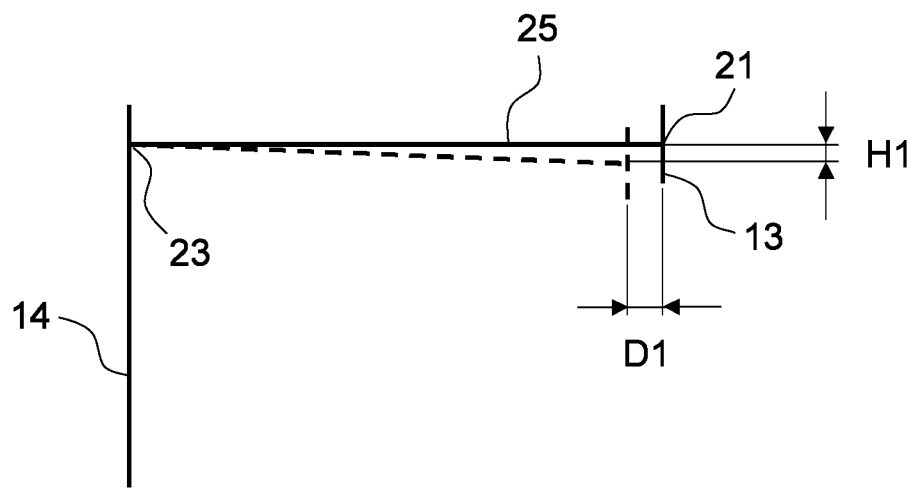
FIG. 7 shows an illustration of the device according to the third embodiment in a side view.

FIG. 5 and FIG. 6 show a device 10 in accordance with a third embodiment. In the third embodiment, the first conjunction unit 24 and the second conjunction unit 25 are each formed in one piece and/or as rigid conjunction units and the third conjunction unit 26 comprises the extension means 27 for linear extending the third conjunction unit 26 [25] when the conjunction units 24, 25, 26 are moved relative to each other. Hence, the length L2 of the connecting means 20 shrinks by distance D1 to length L3 when the conjunction units 24, 25, 26 are moved to each other. According to this embodiment, part of the first conjunction unit 24 is an integral part of the first joint 21 and the second joint 22. Further, part of the second conjunction unit 25 is an integral part of the first joint 21 and the third joint 23. That is, the rod and/or shaft shaped conjunction units 24, 25 each extend as a monolithic body into the corresponding joints 21, 22, 23 and build part of those joints 21, 22, 23. According to the embodiment shown in FIG. 5 and FIG. 6, the middle part of the third conjunction unit 26 is fixed to the carrier frame 14. FIG. 7 shows an illustration of the third embodiment in a side view. As can be seen in FIG. 7, the connecting means 20 and the conjunction units 24, 25, 26 in particular can also be moved in a height direction H1. In other words, the conjunction units 24, 25, 26 may not only be moved in the same plane but rather in a three-dimensional space in a height direction, width direction and a length direction.

The aforesaid description of the accompanying drawings is only by the way of detail and example. Specific features of each aspect of the present invention and the figures can be combined which each other if of technical sense.

REFERENCE SIGNS

10 device
11 lamp
12 vehicle
13 adjustment unit
14 carrier frame
15 plain bearing
16 fixing point
17 horizontal adjustment means
18 vertical adjustment means
20 connecting means
21 first joint
22 second joint
23 third joint
24 first conjunction unit
25 second conjunction unit
26 third conjunction unit
27 extension means
28 locking pin
29 middle part
30 top guiding part
31 bottom guiding part
32 left guiding part
33 right guiding part
L1 length
L2 length
L3 length
W1 width
W2 width
H1 height
D1 distance

The invention claimed is:

1. A device for compensating for cut-off line drift of a lamp in a vehicle, the device comprising:
    an adjustment unit for adjusting the lighting direction of the lamp,
    a carrier frame for carrying a lighting unit of the lamp,
    a triangularly shaped connecting means mechanically connecting the adjustment unit with the carrier frame, the connecting means including:
        a first joint at a first corner of the connecting means,
        a second joint at a second corner of the connecting means,
        a third joint at a third corner of the connecting means,
        a first conjunction unit connected between the first joint and the second joint,
        a second conjunction unit connected between the first joint and the third joint,
        a third conjunction unit connected between the second joint and the third joint,
    wherein the joints move the conjunction units relative to each other to compensate for cut-off line drift,
    wherein the first conjunction unit and the second conjunction unit are each formed in one piece, and
    wherein the third conjunction unit includes an extension means for extending the third conjunction unit linearly when the first conjunction unit, the second conjunction unit, and the third conjunction unit move relative to one another.

2. The device according to claim 1, wherein the second joint and the third joint are mounted at the carrier frame and the first joint is mounted at the adjustment unit.

3. The device according to claim 1, wherein the first joint includes a ball joint allowing free rotation of the first joint in two planes at the same time while preventing translation of the first joint in any direction.

4. The device according to claim 1, wherein the first joint, the second joint and/or the third joint are configured for allowing a scissor movement between pairs of conjunction units.

5. The device according to claim 1, wherein at least one of:
    at least part of the first conjunction unit is an integral and/or monolithic part of the first joint and/or the second joint,
    at least part of the second conjunction unit is an integral and/or monolithic part of the first joint and/or the third joint, and
    at least part of the third conjunction unit is an integral and/or monolithic part of the second joint and/or the third joint.

6. The device according to claim 1, wherein the first conjunction unit, the second conjunction unit and/or the third conjunction unit are each rod-shaped.

7. The device according to claim 1, wherein the carrier frame includes a plain bearing and at least part of the third conjunction unit is supported in the plain bearing.

8. The device according to claim 1, wherein at least part of the third conjunction unit is fixed to the carrier frame.

9. A lamp for a vehicle, the lamp comprising the device according to claim 1.

10. The lamp for a vehicle according to claim 9, wherein the carrier frame carries at least part of an LED-light source or a laser-light source.

11. The lamp for a vehicle according to claim 9, wherein the carrier frame is turnably fixed to a fixing point.

12. The lamp for a vehicle according to claim 9, wherein the lamp is a head lamp.

13. A vehicle comprising the lamp for a vehicle according to claim 9.

* * * * *